Patented Sept. 4, 1945

2,384,105

UNITED STATES PATENT OFFICE 2,384,105

RIBITYLAMINOBENZENES AND PROCESS FOR THE MANUFACTURE THEREOF

John Lee, Essex Fells, Ulrich V. Solmssen, Clifton, and Leo Berger, Nutley, N. J., assignors to Hoffmann-La Roche, Inc., Roche Park, Nutley, N. J., a corporation of New Jersey No Drawing. Application September 30, 1943, Serial No. 504,445

15 Claims. (Cl. 260—211)

Our invention relates to a novel method of producing ribitylaminobenzenes of the probable formula

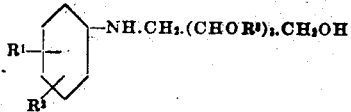

wherein $R^1$ and $R^2$ each stand for hydrogen or lower alkyl, and $R^3$ is acyl, and to new compounds thus obtained.

This class of compounds and methods of making them have come into existence only recently in connection with the development of vitamins, particularly vitamin $B_2$, and they form valuable intermediates for the production of vitamins and drugs.

It is known that one compound of this class, D-ribitylxylidine of the formula

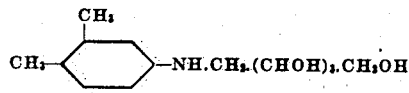

can be prepared by the reduction of the known 3,4-dimethylaniline D-riboside (Karrer et al., Helvetica Chimica Acta 18, 1133, and Kuhn and Birkofer, Ber. 71, 621 (1938)), but the preparation of this intermediate on a technically feasible scale requires the preparation of a crystalline or, at least, highly purified ribose. The manufacture of such ribose has been, up to this time, extremely difficult when one starts from the usual sources which contain only impure ribose, such as the liquors of the sodium amalgam reduction of ribonolactone, or liquors of hydrolysates of nucleic acids, nucleosides and nucleotides.

It is therefore one object of our invention to find a procedure for manufacturing N-ribityl aromatic amines directly from crude ribose-containing materials without the intermediate isolation of ribose and also without the need for intermediate isolation of a pure N-riboside. In connection with this improvement, it is a further object of our invention to provide means of transforming N-pentosides into N-pentosyl aromatic amines.

In our copending application Ser. No. 504,442, filed of even date herewith, we have described and claimed the manufacture of a new class of N-pentosides by a novel condensation process which involves reaction between a primary aromatic amine and a pentose in aqueous alcoholic solution substantially at room temperature and at a pH concentration of from about 2 to about 8. We found that the new aromatic N-pentosides, to which we assigned the probable structure of pyranosides, are characterized by ease of formation and have a strong tendency to separate even when the solutions of the sugars with which the primary amine is condensed are relatively impure. We pointed out that these N-pentosides crystallize directly in good yield and are easily separated from the solution in which they are formed by the addition of soluble alkali metal or ammonium salts which combine with them into loose complex compounds. We found this ability to form complexes to be especially true of those sugars in which the two hydroxyls in 2- and 3-position have cis-configuration; for example, ribose and lyxose give complexes in very high yield. The free pentosides can be isolated from the complexes by extraction with a suitable solvent, as, for example, dioxane and pyridine.

We have now discovered that the N-pentosides of our aforementioned copending application Ser. No. 504,442 and their complex salts can be directly reduced in the presence of hydrogen and a metal catalyst, according to the following equation:

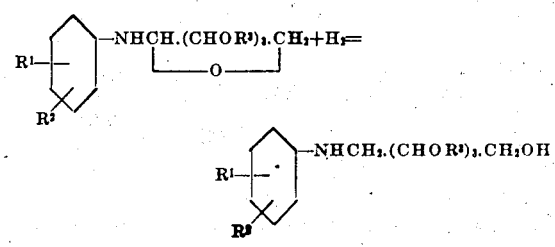

The reduction can be carried out at atmospheric or superatmospheric pressures and at temperatures up to 100° C. The solvent can be an alcohol, such as methanol or ethanol, water, dioxane and the like. Preferably, in carrying out the reaction, we employ a complex formed with a salt which is insoluble in alcohol. This has the advantage that on hydrogenation the ribitylamine formed goes into solution whilst the inorganic salt can be directly filtered from the hot solution after reduction along with the catalyst. Complexes with water-soluble salts can also be used, in this case preferably in substantially aqueous solution so that after filtration of the catalyst the ribityl aromatic amine crystallizes from the aqueous liquor retaining the soluble salt in solution. A suitable pH range of conducting the hydrogenation is 6 to 7.

Furthermore, we have found that the salt-free ribopyranoside which can be obtained by extracting the salt-complex with dioxane can be directly hydrogenated in the dioxane without intermediate isolation or can be isolated by removal of the dioxane and hydrogenated in another solvent.

The free N-ribopyranosides can be acylated, as, for example, with acetic anhydride or benzoyl chloride to form new 2,3,4-triacyl derivatives which can be reduced to 2,3,4-triacylribitylaminobenzenes by the same method.

We have also found that the complexes which can be made from the N-2,3,4-triacylribopyranosides of aromatic amines and water-soluble salts of alkali metals and ammonium as, for example, the complex of sodium sulfate and N-2,3,4-triacetylribopyranoside of aniline can be reduced directly to yield the 2,3,4-triacetylribitylaniline.

The following examples illustrate our invention.

Example 1

25.3 g. α-xylidine-d-ribopyranoside are suspended in 125 cc. absolute alcohol and 2.5 g. Raney Ni added. The mixture is hydrogenated at 500 lbs. at 60° for 1 hour. The catalyst is filtered from the hot solution. The filtrate is set aside for crystallization. The product forms colorless shiny platelets of N-ribityl-3,4-xylidine. Yield 23.0 g. (90%). M. P. 144°. $[\alpha]_D^{25} = -29.0°$ ($c=5\%$ in pyridine) $[\alpha]_D^{25} = -37.5$ ($c=5\%$ in 2N HCl).

Example 2

42.0 g. of α-xylidine-d-ribopyranoside complex with $Na_2SO_4$ (equivalent to 25.3 g. pyranoside) are suspended in 125 cc. absolute alcohol and 2.5 g. Raney Ni added. The mixture is hydrogenated at 500 lbs. at 60° for 1 hour. The catalyst is filtered off while the solution is hot and the filtrate set aside for crystallization. The product consists of colorless shining platelets identical with the product of Example 1. Yield 22.5 g. (88.2%). M. P. 144–5°. $[\alpha]_D^{25} = -29.0°$ ($c=5\%$ in pyridine) $[\alpha]_D^{25} = -37.5°$ ($c=5\%$ in 2N HCl).

Example 3

4.0 g. α-aniline-d-ribofuranoside (M. P. 138–9°) are suspended in 25 cc. absolute alcohol and ca. 0.3 g. Raney Ni is added. The mixture is hydrogenated at 60° at 500 lbs. for 3 hours. It is then worked up as in Example 1. Yield 3.6 g. (90%), ribityl aniline. M. P. 125–7°. Small colorless crystals. $[\alpha]_D^{25} = -42.7°$ ($c=2.5\%$ in pyridine).

Example 4

20 g. α-aniline-N-d-ribopyranoside-sodium sulfate complex (=70.05% riboside) are suspended in 120 cc. absolute alcohol, and 3 g. Raney Ni are added. The mixture is hydrogenated at 65° at 50 lbs. for 8 hours, and is then worked up as in Example 1. Total yield 13.0 g. d-ribityl aniline (92%). M. P. 125–7°. $[\alpha]_D^{25} = -42.0°$ ($c=2.7$ in pyridine).

Example 5

4.0 g. α-aniline-d-ribopyranoside are suspended in 25 cc. dioxan, and ca. 0.3 g. Raney Ni is added. The mixture is hydrogenated at 65°–75° at 500 lbs. for 2 hours. It is worked up as in Example 1. Yield 3.50 g. (88%) ribityl aniline. M. P. 125–7°. $[\alpha]_D^{25} = -42.3°$ ($c=2.7$ in pyridine).

Example 6

15.0 g. of α-2,3,5-tribenzoylaniline-N-d-ribofuranoside are dissolved in 120 cc. ethyl alcohol, 1.5 g. of Raney Ni added, and hydrogenated at 500 lbs. at 60° for 2 hours. The alcohol solution is filtered from the catalyst and evaporated to dryness. A quantitative yield of a light-colored amorphous glass is obtained which cannot be crystallized. Product shrinks at 50–55° without melting.

The analysis of the product indicates that it has probably the structure:

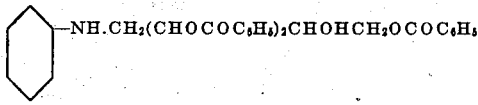

$[\alpha]_D^{28°} = -22.1°$ ($c=8.0$ in pyridine).

Example 7

15.0 g. of α-2,3,4-tribenzoylaniline-N-d-ribopyranoside are dissolved in 120 cc. ethyl alcohol, 1.5 g. Raney Ni added, and hydrogenated at 500 lbs. at 60° for 2 hours. The alcohol solution is filtered from the catalyst and evaporated to dryness. The product obtained is a thick syrup which cannot be crystallized. Yield 15.0 g.

The analysis of the compound indicates that it has the probable structure:

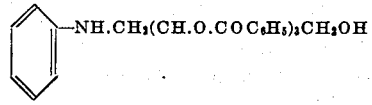

$[\alpha]_D^{28°} = -20.3° \pm 1°$ ($c=1.67$ in pyridine).

Our process, as described in these examples, has the advantage that it avoids the isolation of a pure intermediate N-ribofuranoside. We have found this isolation to be necessary for a good yield by the known process and, moreover, in order to prepare the furanoriboside in good yield it is necessary to have a very good grade of ribose. Our new process is practically independent of the purity of the ribose, since the complex can be formed from relatively impure solutions.

It will be apparent from the above that our invention has resulted in a new, convenient, and economically advantageous method of producing valuable intermediates for industrial purposes, especially for the manufacture of vitamin $B_2$ and its derivatives. A further advantage lies in the production of new, hitherto inaccessible triacylpentityl aromatic amines valuable for the furtherance of scientific research and for industrial technology.

In the appended claims, by metal hydrogenation catalyst we mean a base or noble metal catalyst with or without a support, such as Raney nickel, nickel-kieselguhr, palladium, palladium on carbon or other support, platinum or platinum on suitable carriers; by super atmospheric pressures we mean pressures suitably up to about 2000 lbs. and preferably for nickel catalysts of about 500 lbs. and for noble metal catalysts of around 50 lbs. In stating the temperature range of our operating conditions it is understood that higher or lower temperatures may be used. We have found higher temperatures than 100° to give smaller yields. In the term hydrogenation we mean hydrogenation conducted so that substantially only one molecule of hydrogen is absorbed.

While we have described our invention in considerable detail it is apparent that variations may be made without departing from the spirit and scope thereof, and it is understood that we do not limit ourselves to the specific embodiments thereof except as defined in the appended claims.

What we claim is:

1. The process for the manufacture of a ribitylaminobenzene corresponding to the formula

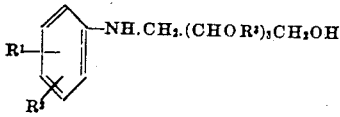

where $R^1$ and $R^2$ are radicals selected from the group consisting of hydrogen and lower alkyl, and $R^3$ is a radical selected from the group consisting of hydrogen and acyl residues, which residues are selected from the group consisting of those of the lower fatty acids and aromatic acids of the benzene series, which process comprises hydrogenating a riboside corresponding to the formula

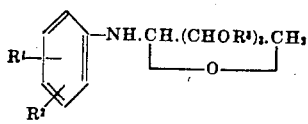

where $R^1$, $R^2$ and $R^3$ have the above described values, in the presence of a metal hydrogenation catalyst in a solvent.

2. The process according to claim 1, in which hydrogenation is carried out at a pH range of from 6 to 7.

3. The process of claim 1, in which the riboside is employed in the form of a complex with a salt which is insoluble in alcohol.

4. The process of claim 1, in which the riboside is hydrogenated in the form of a complex with a water-soluble salt.

5. The process for the manufacture of a ribitylaminobenzene corresponding to the formula

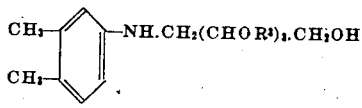

wherein $R^3$ is a radical selected from the group consisting of hydrogen and acyl residues which have been selected from the group consisting of the residues of the lower fatty acids and of aromatic acids of the benzene series, which process comprises hydrogenating a riboside corresponding to the formula

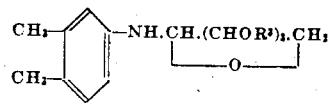

wherein $R^3$ has the above signification, in the presence of a metal hydrogenation catalyst in a solvent.

6. The process for the manufacture of 1-ribitylamino-3,4-dimethylbenzene, which comprises hydrogenating 3,4-dimethylaniline-N-d-ribopyranoside in the presence of a metal hydrogenation catalyst in a solvent.

7. The process for the manufacture of 1-ribitylamino-3,4-dimethylbenzene, which comprises hydrogenating 3,4-dimethylaniline - N - d - ribopyranoside in the presence of a nickel catalyst in methanol.

8. The process for the manufacture of ribitylamino-3,4-xylidine, which comprises suspending α-xylidine-d-ribopyranoside complex with sodium sulfate in absolute alcohol together with Raney Ni as a catalyst, hydrogenating said mixture at about 500 lbs. pressure at 60° C., filtering off the catalyst while the solution is hot, and setting aside the filtrate for crystallization.

9. The process for the manufacture of triacetylribitylaminoxylidine, corresponding to the structure:

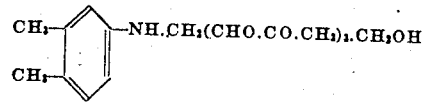

which comprises hydrogenating 2,3,4-O-triacetyl-3,4-dimethylaniline-N-d-ribopyranoside in the presence of a metal hydrogenation catalyst in a solvent.

10. The process for the manufacture of triacetylribitylaminoxylidine, corresponding to the structure:

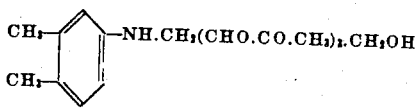

which comprises hydrogenating 2,3,4-O-triacetyl-3,4-dimethylaniline-N-d-ribopyranoside in the presence of a nickel catalyst in methanol.

11. The process for the manufacture of tribenzoylribitylaminoxylidine, corresponding to the structure:

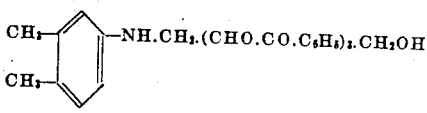

which comprises hydrogenating 2,3,4-O-tribenzoyl-3,4 - dimethylaniline-N-d-ribopyranoside in the presence of a metal hydrogenation catalyst in a solvent.

12. The process for the manufacture of tribenzoylribitylaminoxylidine, corresponding to the structure:

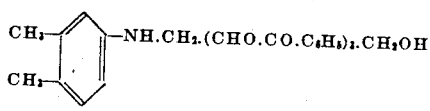

which comprises hydrogenating 2,3,4-O-tribenzoyl - 3,4 - dimethylaniline-N-d-ribopyranoside in the presence of a nickel catalyst in methanol.

13. The 2,3,4-triacylribitylaminobenzenes, corresponding to the formula:

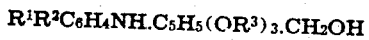

where $R^1$ and $R^2$ are radicals selected from the group of lower alkyl and hydrogen, $R^3$ is a radical selected from the group of acyl residues derived from the lower fatty acids and aromatic acids of the benzene series.

14. 1-(2,3,4 - O - triacetylribitylamino) - 3,4-dimethylbenzene.

15. 1-(2,3,4-O-tribenzoylribitylamino) - 3,4-dimethylbenzene.

JOHN LEE.
ULRICH V. SOLMSSEN.
LEO BERGER.